Patented Feb. 5, 1946

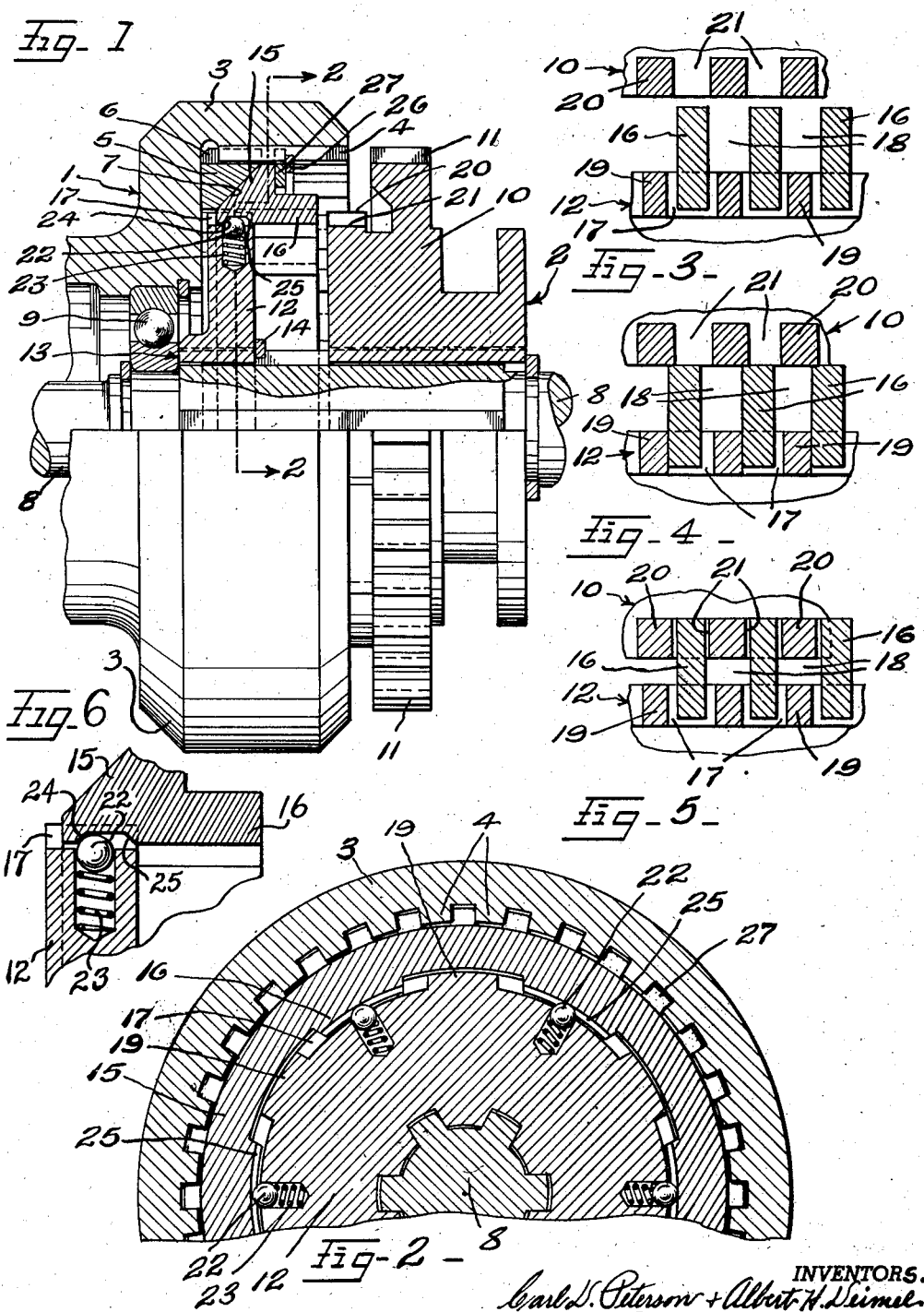

2,394,098

UNITED STATES PATENT OFFICE 2,394,098

BALKING RING CLUTCH

Carl D. Peterson and Albert H. Deimel,
Toledo, Ohio

Application August 14, 1943, Serial No. 498,676

5 Claims. (Cl. 192—53)

This invention relates to balking ring clutches, and has for its object a simple arrangement of the balking ring, a shiftable clutch element, and a support for the balking ring, which rotates with the shiftable clutch element, and also a simple spring arrangement for spring loading the balking ring to press it in engagement with a friction surface, which rotates relatively to the balking ring, when the clutch is disengaged.

The invention consists in the novel features and in the combinations and constructions hereinafter set forth and claimed.

In describing this invention, reference is had to the accompanying drawing, in which like characters designate corresponding parts in all the views.

Figure 1 is a longitudinal sectional view, partly in elevation, of a balking ring clutch embodying this invention.

Figure 2 is a sectional view on line 2—2, Figure 1.

Figures 3, 4 and 5 are diagrammatic operation views showing the blocking and unblocking action of the balking ring.

Figure 6 is an enlarged fragmentary view showing the poppet and contiguous parts on an enlarged scale.

A balking ring clutch usually includes driving and driven structures adapted to be positively clutched, one of said structures having a set of clutch teeth and a friction face, the other structure including an axially shiftable clutch member adapted to mesh with said teeth, and a balking member or ring engaged with said friction surface and having blocking means and also limited rotation with respect to the other structure for positioning the blocking means in blocking relationship with respect to the shiftable member when said structures are rotating at relatively different speeds, and for disposing said blocking means out of said blocking relationship to permit clutching shift of said shiftable clutch member, when the speeds of said structures cross.

This balking ring clutch includes a support for the balking ring and spring-pressed poppets carried by the support and coacting with cam surfaces on the balking ring to urge the balking ring at all times into engagement with the friction surface on one of the structures, and also a novel arrangement of the blocking projections or teeth on the balking ring, shiftable clutch member and support for the balking ring.

1, 2 designate, generally, driving and driven structures, the driving structure including a drive shaft having a head 3 formed with a cylindrical recess on the inner cylindrical wall of which are provided splines, the outer end portions 4 of which constitute internal clutch teeth. The friction surface of the driving structure is shown as provided on a separate ring 5 located in the recess against the bottom thereof and having peripheral teeth 6 interlocked with the inner ends of the splines of the head 3. The friction surface 7 of the friction ring 5 is, in this embodiment of the invention, shown as conical. The driven structure includes a shaft 8 usually journalled at one end in a pilot bearing 9 in the driving structure 1 and an axially shiftable clutch member 10 slidably splined on the shaft 8, the clutch member having peripheral clutch teeth 11 which are shiftable into and out of interlocking engagement with the clutch teeth 4. The driven structure 2 also includes a balking ring support 12 splined on the shaft 8, so that it rotates with the shaft. It is, however, held from axial movement on the shaft, it being here shown as thrusting at one end at 13 against the bearing 9, and at its other end against a lock ring 14.

15 designates the balking ring, here shown as encircling the support 12 and having blocking internal teeth or projections 16, which extend into peripheral notches 17 in the support 12, the balking ring also having grooves 18 between the internal projections 16 into which extend projections or lands 19 on the support 12. The projections 16 are of less width than the notches 17 and also the lands 19 are of less width than the notches 18. This arrangement permits the limited rotation of the balking ring relatively to its support 12 or the driven structure including the shiftable clutch member 10.

The shiftable clutch member 10 is provided with peripheral shoulders or projections 20 on the hub thereof with spaces 21 between the projections 20. The spaces between the projections 20 are of such width as to slidably fit the internal teeth 16 of the balking ring.

In operation, when the speeds are different, the balking ring is dragged by the rotating driving structure, due to the friction at the friction face 7 into a position analogous to that shown in Figure 4, or a position wherein the internal blocking teeth 16 of the balking ring are out of alinement with the spaces 21 of the clutch section 10 and in position to coact with the projections 20 of the clutch member 10, as seen in Figure 4, and block shifting in of the clutch member 10. Then upon deceleration of the engine, in case of an up-shift, or acceleration, in case of a down-shift, the balking ring is drawn from the blocking position shown in Figure 4 to a position analogous to that shown in Figure 3 with the exception that the projections 16 of the balking ring are at the entrance of the spaces 21 of the clutch member 10, so that upon continued shifting-in movement, the clutch member 10 moves into the position shown in Figure 5, wherein the spaces 21 receive the blocking teeth 16 of the balking ring. During this movement illustrated in Figure 5, the clutch teeth 11 interlock with the clutch teeth 4.

In order that the balking ring may be moved into blocking position, as shown in Figure 4, immediately upon declutching of the clutch, the balking ring is spring loaded to press it against the friction surface 7 of the ring 5 rotatable with the driving structure 1. In this embodiment of the invention, the spring pressure is provided by spring-pressed poppets or balls 22 located in radial sockets in the support 12 and pressed outwardly by springs 23 in the sockets. The balls coact with inclined cam surfaces 24 provided on the inner ends of the projections or teeth 16 on the balking ring, these inclined surfaces being like ends of notches 25 formed in the teeth or projections 16. When shifting-in force is applied, and before the speeds cross, the parts are in the position shown in Figure 4, and the friction at the face 7 is in proportion to the shifting-in force applied to the clutch member 10, so that the balking ring always remains in the control of the driving member 3, or there is always enough friction at the face 7 to cause the balking ring to rock relatively to the driven structure toward unlocked positions, as the speeds cross.

The balking ring is held assembled with the head 3 by means of a lock ring 26 coacting with the washer 27 interposed between it and an annular face on the balking ring. The washer 27 has peripheral teeth which are interlocked with internal splines in the head 3.

What we claim is:

1. In a balking ring clutch, driving and driven structures adapted to be positively clutched, one structure having a set of clutch teeth and a friction surface, the other structure including an axially shiftable toothed clutch member drivingly carried by said other structure and adapted to mesh with said teeth of said one structure, a balking member engageable with said friction surface and having blocking means and a limited rotation with respect to said other structure for positioning the said blocking means in blocking relationship with respect to the said clutch member, when said structures are rotating at relatively different speeds, and for disposing said blocking means out of said blocking relationship to permit clutching shift of said clutch member, when the speeds of said structures cross, a support for the balking ring mounted on and fixed to said other structure, the balking member encircling its support, and spring means carried by the support coacting with the balking member to thrust the balking member into engagement with said friction surface.

2. In a balking ring clutch, driving and driven structures adapted to be positively clutched, one structure having a set of clutch teeth and a friction surface, the other structure including an axially shiftable toothed clutch member drivingly carried by said other structure and adapted to mesh with said teeth, a balking member engageable with said friction surface and having blocking means and a limited rotation with respect to said other structure for positioning the said blocking means in blocking relationship with respect to the said clutch member, when said structures are rotating at relatively different speeds, and for disposing said blocking means out of said blocking relationship to permit clutching shift of said clutch member, when the speeds of said structures cross, a support for the balking ring mounted on and fixed to said other structure, the balking member encircling its support, and spring means carried by the support coacting with the balking member to thrust the balking member into engagement with said friction surface, the balking member having inclined cam faces, the spring means being spring-pressed poppets carried by the support and coacting with said cam faces.

3. In a balking ring clutch, driving and driven structures adapted to be positively clutched, one structure having a set of clutch teeth and a friction surface, the other structure including an axially shiftable toothed clutch member drivingly carried by the other structure and adapted to mesh with said teeth, a balking member engageable with said friction surface and having blocking means and a limited rotation with respect to said other structure for positioning the said blocking means in blocking relationship with respect to the said clutch member, when said structures are rotating at relatively different speeds, and for disposing said blocking means out of said blocking relationship to permit clutching shift of said clutch member, when the speeds of said structures cross, a support for the balking ring mounted on and fixed to said other structure, the balking member encircling its support, and spring means carried by the support coacting with the balking member to thrust the balking member into engagement with said friction surface, the support being formed with peripheral notches and projecting lands between the notches, the balking ring being formed with internal projections extending into the notches and also with notches for receiving said lands, the notches in both instances being wider than the teeth on the balking ring and the lands on the support for permitting the limited rotation of the balking ring, the internal projections on the balking ring being provided with notches having cam end faces and the spring means being spring-pressed poppets carried by the support and being pressed into said notches and coacting with same cam faces.

4. In a balking ring clutch, driving and driven structures adapted to be positively clutched, one structure having a set of clutch teeth and a friction surface, the other structure including an axially shiftable toothed clutch member drivingly carried by the other structure and adapted to mesh with said teeth, a balking member engageable with said friction surface and having blocking means and a limited rotation with respect to said other structure for positioning the said blocking means in blocking relationship with respect to the said clutch member, when said structures are rotating at relatively different speeds, and for disposing said blocking means out of said blocking relationship to permit clutching shift of said clutch member, when the speeds of said structures cross, a support for the balking ring mounted on and fixed to said other structure, the balking member encircling its support, the support being provided with notches and the balking ring with internal projections extending into the notches and being of less width than the same for permitting said limited rotation, the projections constituting said blocking means, said clutch member having spaced apart projections and spaces between them, the spaces being of substantially the width of the blocking projections of the balking ring, and the projections of the balking ring being out of alinement with said spaces when the speeds are different and being brought into alinement therewith when the speeds cross.

5. In a balking ring clutch, driving and driven structures adapted to be positively clutched, one structure having a set of clutch teeth and a friction surface, the other structure including an axially shiftable toothed clutch member drivingly carried by the other structure and adapted to mesh with said teeth, a balking member engageable with said friction surface and having blocking means and a limited rotation with respect to said other structure for positioning the said blocking means in blocking relationship with respect to the said clutch member, when said structures are rotating at relatively different speeds, and for disposing said blocking means out of said blocking relationship to permit clutching shift of said clutch member, when the speeds of said structures cross, a support for the balking ring mounted on and fixed to said other structure, the balking member encircling its support, the support being provided with notches and the balking ring with internal projections extending into the notches and being of less width than the same for permitting said limited rotation, the projections constituting said blocking means, said clutch member having spaced apart projections and spaces between them, the spaces being of substantially the width of the blocking projections of the balking ring, and the projections of the balking ring being out of alinement with said spaces when the speeds are different and being brought into alinement therewith when the speeds cross, the blocking projections of the balking ring having notches in their inner ends, like ends of the notches being formed inclined and radially-acting, spring-pressed poppets carried by the support and coacting with said inclined faces.

CARL D. PETERSON.
ALBERT H. DEIMEL.